(12) United States Patent
Corrion

(10) Patent No.: US 10,120,517 B2
(45) Date of Patent: *Nov. 6, 2018

(54) TAP ZONES FOR NEAR FIELD COUPLING DEVICES

(71) Applicant: Intel Corporation, Santa Clara, CA (US)

(72) Inventor: Bradley W. Corrion, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/371,140

(22) Filed: Dec. 6, 2016

(65) Prior Publication Data

US 2018/0101256 A1     Apr. 12, 2018

Related U.S. Application Data

(63) Continuation of application No. 13/976,104, filed as application No. PCT/US2011/066354 on Dec. 21, 2011, now Pat. No. 9,529,480.

(51) Int. Cl.
| | | |
|---|---|---|
| *G06F 3/044* | (2006.01) | |
| *H04B 5/00* | (2006.01) | |
| *G06F 3/046* | (2006.01) | |
| *G06F 3/041* | (2006.01) | |

(52) U.S. Cl.
CPC ............ *G06F 3/044* (2013.01); *G06F 3/046* (2013.01); *G06F 3/0416* (2013.01); *H04B 5/0012* (2013.01)

(58) Field of Classification Search
CPC .................. G06F 3/041–3/047; H04B 5/0012
USPC ........ 345/173–179; 178/18.01–18.09, 18.11, 178/19.01–19.07
See application file for complete search history.

(56) References Cited

U.S. PATENT DOCUMENTS

| | | | | |
|---|---|---|---|---|
| 2005/0088416 A1* | 4/2005 | Hollingsworth | .......... | G06F 3/02 345/173 |
| 2010/0265189 A1* | 10/2010 | Rofougaran | ............ | G06F 3/046 345/173 |
| 2011/0063224 A1* | 3/2011 | Vexo | ................... | G06F 3/04886 345/168 |
| 2013/0082937 A1* | 4/2013 | Liu | ....................... | G06F 1/3262 345/173 |

FOREIGN PATENT DOCUMENTS

| | | |
|---|---|---|
| CN | 1315025 A | 9/2001 |
| CN | 101416412 A | 4/2009 |
| CN | 201215827 Y | 4/2009 |

(Continued)

OTHER PUBLICATIONS

Office Action dated Sep. 19, 2017 for Chinese Patent Application No. 201180075727.0.

(Continued)

*Primary Examiner* — Stephen G Sherman
(74) *Attorney, Agent, or Firm* — Schiff Hardin LLP

(57) ABSTRACT

Described herein are techniques related to near field coupling and more particularly using near field coupling related taps to indicate user selections on input/output devices. This Abstract is submitted with the understanding that it will not be used to interpret or limit the scope or meaning of the claims.

18 Claims, 5 Drawing Sheets

(56) References Cited

FOREIGN PATENT DOCUMENTS

| | | |
|---|---|---|
| CN | 101452521 A | 6/2009 |
| CN | 101866237 A | 10/2010 |
| EP | 2244175 A2 | 10/2010 |

OTHER PUBLICATIONS

Office Action dated Aug. 2, 2017 for European Patent Application No. 11878310.9.
Office Action dated Mar. 22, 2018 for Chinese Application No. 201180075727.0.

\* cited by examiner

TAP ZONES FOR NEAR FIELD COUPLING DEVICES

BACKGROUND

Many interactions between users or between a user and another device require multiple, and perhaps cumbersome, steps. For instance, accepting a sales contract at a cash register, sales terminal, kiosk, or other point of sale device might involve numerous user selections, numerous exchanges of information responsive thereto, confirmation activities, etc. Each of which might require users to manipulate user interfaces (UIs) and information on one or both devices. Thus, one transaction might involve the equivalent of dozens, scores, or even more mouse clicks, taps, etc. User frustration with such transactions seems likely as a result.

Near Field Communication (NFC) is a standards-based connectivity technology that establishes wireless connection between two devices in close proximity of each other (e.g., within 4 centimeters and theoretically up to 20 centimeters). NFC allows users to transfer information by touching, or tapping, one device with another device. The act of bringing one NFC-enabled device to close proximity of another NFC-enabled device with or without the two devices physically contacting each other, referred to as "NFC bump" or "NFC tap" hereinafter. It may also be more generally called "bumping" or "tapping."

Recently, products and services have arisen providing for the exchange of credit card transaction information, personal information, point of sale (POS) information, information concerning a user's identity information regarding a user's presence, etc. Those types of information can be stored in a device owned or used by one user and transferred according to some NFC-related technique. For instance, users can "bump" or "tap" two NFC-enabled devices together whereupon the devices couple and exchange information according to a pre-arranged or programmed protocol, algorithm, process, method, etc.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Disclosed herein are techniques and technologies related to near field coupling (NFC) and more particularly using one or more NFC taps to indicate user selections on input/output devices. More particularly, embodiments allow a user to tap one NFC enabled device on another NFC enabled device once, and with that one tap make a selection that would have required many, potentially cumbersome steps on conventional devices.

Exemplary Systems

Figure 1:
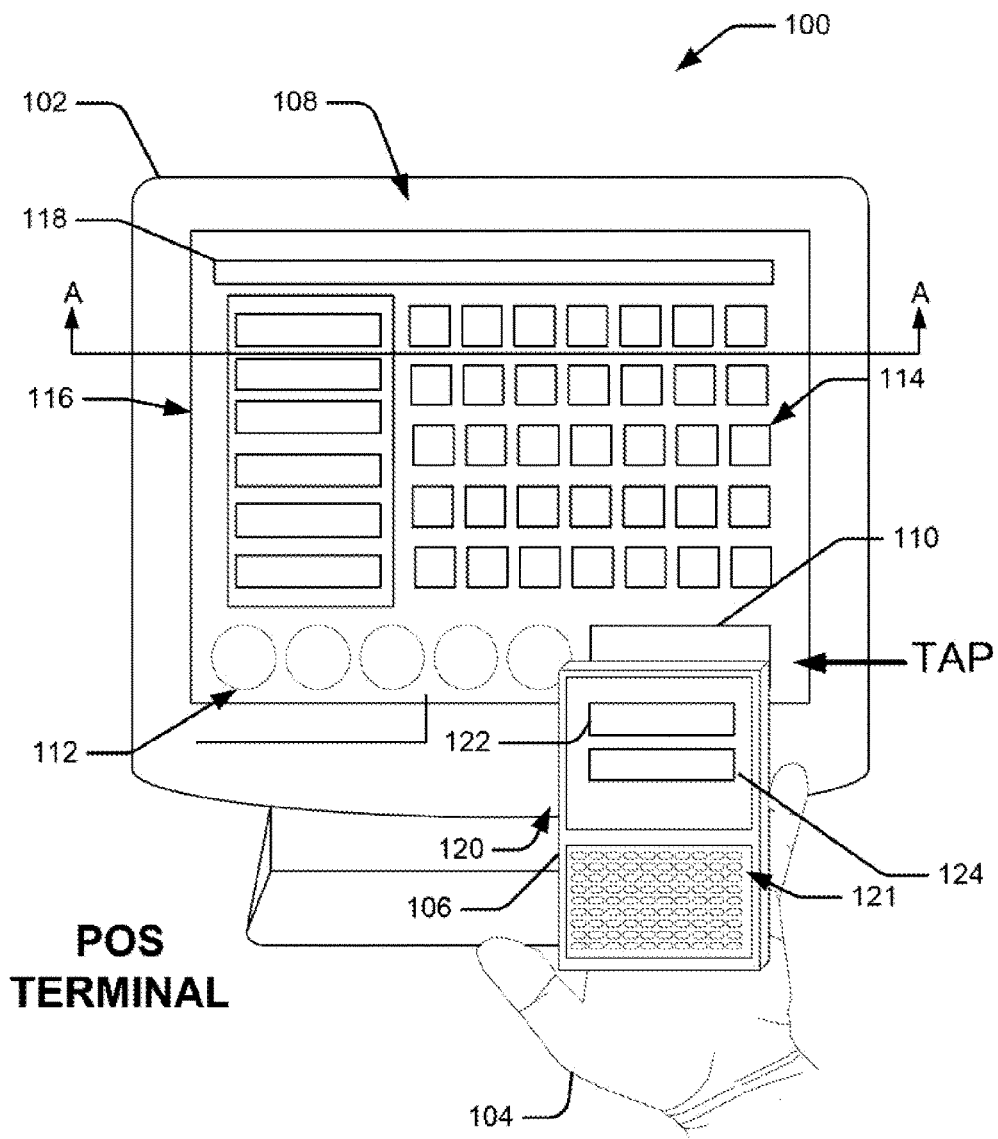
FIG. 1 is a perspective view of a system of embodiments.

FIG. 1 is a perspective view of a system 100 of one or more embodiments of the technology described herein. More specifically, FIG. 1 illustrates the system 100 as including an input/output device 102 and (a user 104 using) a mobile device 106 to make selections on the input/output device 102. Depending on circumstances, the input/output device 102 might be a point of sale (POS) terminal through which users 104 might wish to make one or more selections involving potentially multi-tiered decisions. As such, in conventional systems the user 104 might have had to resort to numerous, cumbersome manipulations of the mobile device 106 and/or the input/output device 102 to ultimately make even one selection.

For instance, should the input/output device 102 be an airline ticket counter kiosk, the user 104 might have to make many selections. For instance, the user might have had to make their identity known to the terminal; confirmed its recognition of that identity; selected one out of many itineraries; selected one or more parties to that itinerary selected one or more portions of the itinerary pertinent to that party; etc.

Conventional systems approach this problem by presenting a potentially lengthy stream of binary choices which the user 104 selects from by manually manipulating input devices on the input/output device 102 and/or mobile device 106 to navigate the illustrative and lengthy selection making processes. It might be understood, but such processes allow one error to throw the entire selection process into disarray, cause user frustration, and waste time that might have been spent in other more desirable ways.

However, systems 100 of the current disclosure alleviate at least some of these concerns by, in part, providing input/output devices 102 which allow users 104 to conveniently make multiple selections (or navigate multiple conventional decision making levels) with their mobile devices 106. And, more specifically in some situations, users 104 can do so by making one tap of an NFC-enabled device (such as mobile device 106) on the input/output device 102. Of course, that tap (or bump) need not be by way of physical contact between the two devices. NFC enabled devices such as the input/output device 102 and the mobile device 106 of the current embodiment can establish NFC coupling whenever they are in close enough proximity to one another. Hence, terms such as "tap" and/or "bump" as used herein do not imply or necessitate physical contact between such devices. Further features of system 100 are disclosed with ongoing reference to FIG. 1.

More specifically, the input/output device 102 of embodiments includes a graphical user interface (GUI) 108 that can display information graphically. For instance, FIG. 1 illustrates a typical GUI 108 with many icons 110, icon groups 112, 114, and 116, banners 118, etc. Often, GUI 108 designers spend significant amounts of time, labor, and creativity developing GUIs 108 which succinctly and accurately present information and icons 110 (et al.) for selecting choices based on the displayed information. For instance, some icons 110 allow a user to indicate that the information displayed in conjunction with that icon 110 represents a choice or selection, which they wish to make by touching or tapping that icon 110. However, when the tapping occurs via an NFC-enabled device such as mobile device 106, conventional systems have no capability to determine to which icon 110 the user 104 might have indicated assent. Indeed, conventional systems can only recognize binary choices (e.g., a single device was tapped—or not).

This limitation of conventional systems often leads to lengthy selection "trees" as the conventional systems execute an electronic "20 questions" strategy to whittle the universe of possible options down to the user's ultimate selection. Anyone who has navigated more than a few selection layers of such conventional systems probably experienced at least some frustration with the waste of time and inefficiencies created by such conventional systems.

Thus, in some situations, conventional systems require the user 104 to access the display 120 of the mobile device and choose one or more input mechanisms 121 on that display 120 to assist with making a choice on the separate and distinct input/output device 102. Moreover, to obtain feedback on how a conventional system might have interpreted the apparent choice made by the user 104, the user 104 might have had to observe what changes (if any) might have occurred to various output elements 122 and 124 on the mobile device 106 and/or the GUI 108 of the input/output device 102. Thus, a multitude of errors, omissions, and oversights often occur during the design and development of the GUI 108 and its underlying software, firmware, hardware, etc. As is disclosed with reference to FIG. 2, system 100 eliminates many of these inconvenient and/or cumbersome user steps from such selection processes.

Figure 2:
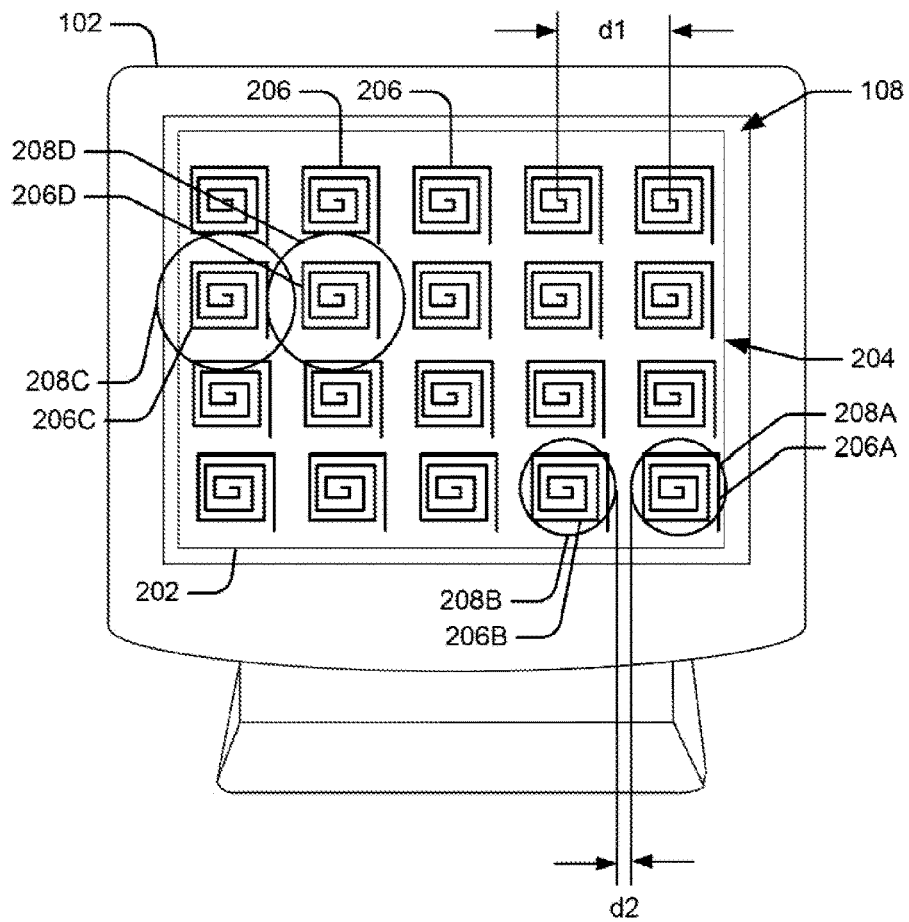
FIG. 2 is a side elevation view of an input/output device of embodiments.

FIG. 2 is a side elevation view of an input/output device of one or more embodiments of the technology described herein. More particularly, FIG. 2 illustrates an input/output device 102 with its display screen removed to reveal a printed circuit board (PCB) 202 that carries an array 204 of NFC compatible antennas 206 (in the current embodiment). FIG. 2 also illustrates a two pairs of tap zones 208A and 208B and 208C and 208D associated with, respectively, two pairs of NFC compatible antennas 206A and 206B and 206C and 206D. Each NFC compatible antenna 206 will couple with and therefore sense magnetic fields associated with other NFC compatible antennas particularly if these other antennas happen to be transmitting at or near the resonant frequency of the NFC compatible antennas 206. According to the strength of these magnetic fields, the NFC compatible antennas 206 (and associated circuitry) will recognize that one of these transmitting NFC compatible antennas is in close enough proximity to establish NFC coupling per appropriate protocols.

Thus, tap zones 208 exist in the volume about each of the NFC compatible antennas 206. The tap zone for a particular NFC compatible antenna 206 will typically be centered about that antenna. As a result, the center-to-center distances d1 between the antennas will play a role in determining whether the tap zones 208 of various NFC compatible antennas 206 overlap, are merely contiguous, or happen to be spaced apart. FIG. 2 illustrates two situations. In one situation, the distance d1 between NFC compatible antennas 206C and 206D (and other pertinent aspects such as the geometry of the antennas themselves) causes the tap zones 208C and 208D to overlap as illustrated. However, similar aspects of the NFC compatible antennas 206A and 206B result in corresponding tap zones 208A and 208B, which do not overlap as the distance d2 there between illustrates. For embodiments in which the tap zones 208 are contiguous, the distance d2 is approximately zero. Thus, it is possible to fabricate antenna arrays 204 with tap zones 208 which overlap, are at most contiguous (i.e., they might touch but do not significantly overlap), and/or that are spaced apart by distances d2.

Figure 3:
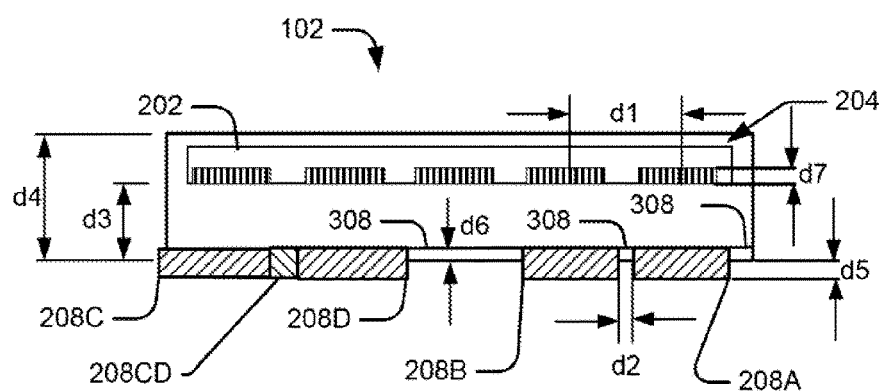
FIG. 3 is a top plan view of an input/output device of embodiments.

FIG. 3 is a top plan view of an input/output device of one or more embodiments of the technology described herein. In addition to many of the features illustrated by FIG. 2, FIG. 3 illustrates a visual display 308 upon which the input/output device 102 projects GUI 108. Of course, depending on the technology employed by input/output device 102, the GUI 108 might be created within visual display 308 or otherwise associated therewith. FIG. 3 also illustrates several other distances d3, d4, d5, d6, and d7 defined by the input/output device 102.

More specifically, distance d3 is the distance by which the NFC compatible antennas 206 (and/or the antenna array 204) of the current embodiment are spaced apart from the visual display 308. Indeed, as further disclosed herein the distance d3 between the NFC compatible antennas 206 and the visual display 308 can be chosen to tailor the tap zones 208 as might be desired. Distance d4 illustrates an overall depth of the input/output device 102 and can represent a maximum distance between the NFC compatible antennas 206 and the visual display 308 beyond which tap zones associated with the visual display 308 might be impracticable to create with typical NFC compatible antennas 206. However, this is not to say that the distance d4 represents some maximum dimension of the input/output device 102. Distance d5 illustrates that the tap zones 208 might extend beyond the surface of the visual display 308 opposite the NFC compatible antennas 206 by some amount. Further still, with reference to distance d6, FIG. 3 illustrates that the visual display 308 has some thickness or distance d6 separating its two opposing surfaces. Of course, the NFC compatible antennas 206 have a thickness too as represented by distance d7.

Furthermore, FIG. 3 also illustrates that tap zones 208A and 208B extend beyond the visual display 308 by the distance d5. FIG. 3 also illustrates the tap zones 208C and 208D overlapping in a region 208CD where either NFC compatible antenna 206C, 206D, or both could establish an NFC coupling with other NFC compatible antennas therein. It might also be worth noting that distances d1 and d2 happen to be orthogonal to distances d3, d4, d5, d6, and d7 as defined by the input/output device 102 of the current embodiment.

Moreover, it is noted at this juncture that the center-to-center distances d1, the antenna-to-visual display offset distance d3, visual display thickness distance d6, and the characteristics of the NFC compatible antennas 206 (or other antennas) such as their thickness d7 can be chosen by users designing such devices. More particularly, these features of the input/output device 102 can be selected so as to create tap zones 208 which either overlap, are contiguous, or are spaced apart as might be desired. Thus, the designers and implementers of this technology can set location, size, shape, and other features of the tap zones 208. More specifically still, the volumes defined by the tap zones 208 can be chosen in conjunction with the geometry of the visual display 308 and that of the GUI 108 associated therewith as is further illustrated with reference to FIG. 4.

Figure 4:
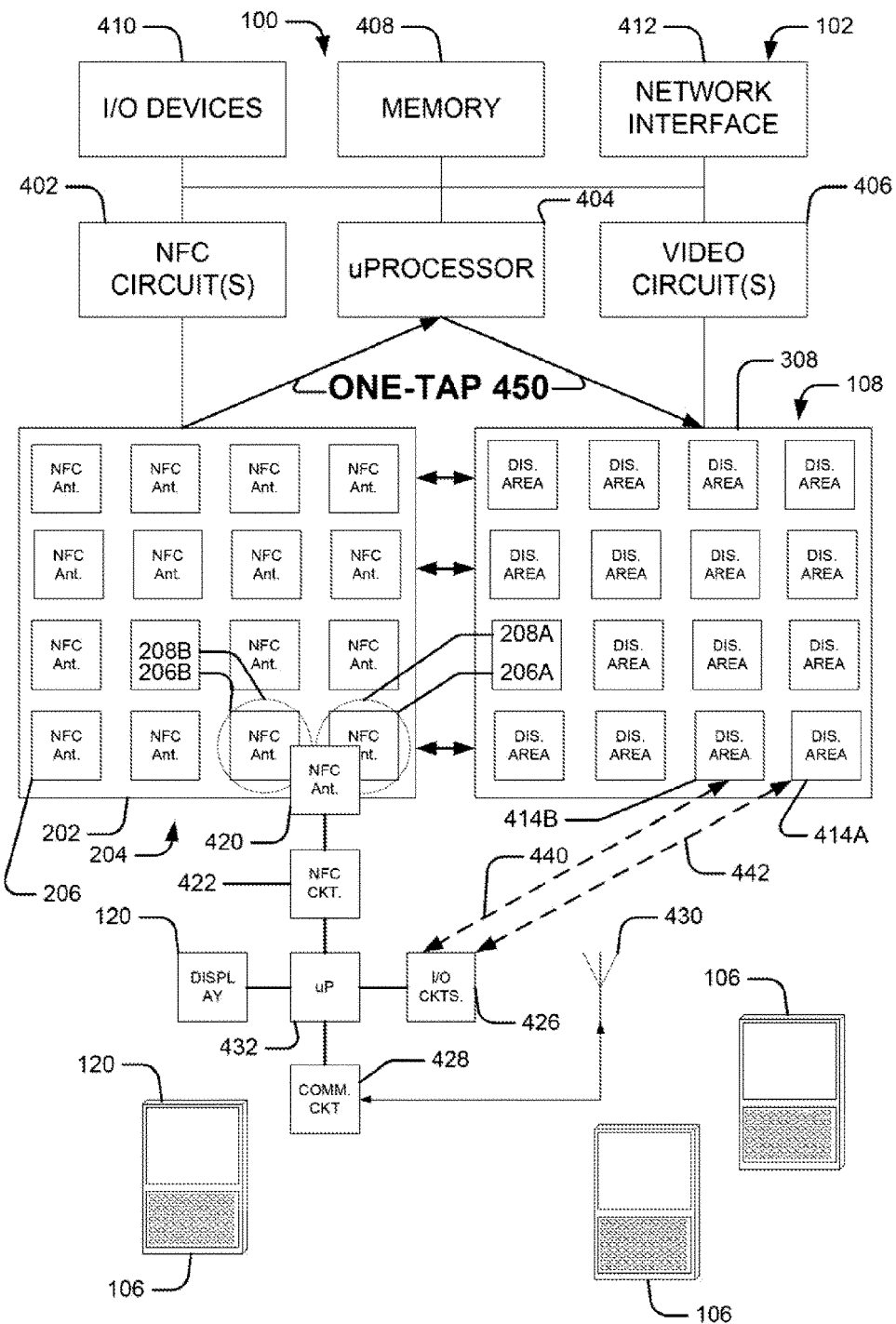
FIG. 4 is a block diagram illustrating a system of embodiments.

FIG. 4 is a block diagram illustrating a system of one or more embodiments of the technology described herein. In addition to many of the features further disclosed herein, FIG. 4 also illustrates a number of features associated with the input/output device 102. For instance, FIG. 4 illustrates NFC circuits 402, processor 404, video circuits 406, memory 408, input/output devices 410, network interface 412, and a plurality of display areas 414. With regard to the mobile device 106, FIG. 4 illustrates at least one NFC compatible antenna 420, a corresponding NFC circuit(s) 422, the display 120, input/output circuits 426, a communication circuit 428, a cellular antenna 430, and a processor 432. Between the input/output device 102 and the mobile device 106, FIG. 4 illustrates figuratively conventional interactions 440 and 442 and a singular one-tap interaction 450 in accordance with embodiments. For illustrative purposes, the PCB 202 and the visual display 308 are shown as being offset from each other. However, in operation, the PCB 202 and the visual display 308 can be held in more or less fixed relationship to each other with one being adjacent to and registered with the other.

In the current embodiments, the NFC circuits 402 and 420 of the input/output device 102 and mobile device 106 (respectively) serve to condition signals to be transmitted or that have been received via the NFC compatible antennas 206 and 420. For that reason, among others, the NFC circuits 402 and 422 are connected between the processors 404 and 432 of the input/output device 102 and the mobile device 106. Moreover, as illustrated in FIG. 4, the processors 404 and 432 control the overall operation of these devices. Indeed, the processors 404 and 432 play a role in one-tap interactions 450 of embodiments as is disclosed further herein.

With regard to the other components of the input/output device 102, the video circuits 406 (in cooperating with the processor 404) control and drive the GUI 108 of visual display 308. Moreover, the memory 408 serves to store computer readable instructions (which the processor 404 reads and executes) for controlling the input/output device 102. In addition, the memory 408 stores information for the processor 404 and other components of the input/output device 102. In addition, many input/output devices 102 have various subsidiary input/output devices 410 such as keyboards, pointing devices, etc. Some input/output devices 102 also include a network interface 412 for communicating with wide area networks (WAN) such as the Internet and/or other networks.

Display areas 414 in the GUI 108 of the input/output device 102 are shaped and distributed about the GUI 108 as users might desire. More specifically, the locations of the display areas 414 can be chosen (and programmed via the processor 404) to correspond to the locations of the NFC compatible antennas 206 of the PCB 202 (or antenna array 204). In the alternative, or in addition, the locations of the NFC compatible antennas 206 and display areas 414 can be chosen in conjunction with each other so that they register with each other. Moreover, because the distances d1-d7 and the configurations of the NFC compatible antennas 206 and 420 cooperate to create tap zones 208, a tap in one of the tap zones 208 will usually bring the NFC compatible antenna 420 close enough to one of the corresponding NFC compatible antennas 206 to couple therewith. Furthermore, since the tap zones 208 and display areas 414 register with each other, that tap can be associated with the corresponding display area 414.

Accordingly, FIG. 4 illustrates two such tap zones 208A and 208B and corresponding display areas 414A and 414B (and NFC compatible antennas 206A and 206B) respectively. While it is possible that a tap might bring the NFC compatible antenna 420 of the mobile device 106 into the tap zones 208A and 208B of these two or more NFC compatible antennas 206A and 206B, the processor 404 can be programmed to pick one of the two NFC compatible antennas as the one that "coupled" with the mobile device 106 in various ways to resolve this issue. Moreover, display areas 414 can be programmed to display various icons, which correspond to various user choices of information which they might wish to enter into the input/output device 102. For instance, the user might wish to select between a plurality of options presented by the GUI 108 wherein each icon 110 corresponds to one of the many options.

For instance, one display area 414A might display a "Yes" icon and the other display area 414B might display a "No" icon. Of course, icons corresponding to many choices could be displayed in the display areas 414. In that way, a user would not be limited to merely binary choices. For instance, a range of icons labeled with numbers between 1 and 10 could be programmed to display in corresponding display areas 414. With reference to FIG. 1 again, various display areas 414 could be programmed with icons 110, icon groups 112, 114, and/or 116 located therein or elsewhere to define and present a set of selections for the user.

In such situations, users can make a multiplicity of choices simultaneously. For instance, each of the icon groups 112, 114, and/or 116 might correspond to different functions. Moreover, each icon 110 therein might correspond to a setting, variable, etc. associate with the corresponding function. By tapping a particular icon 110 in a particular icon group 112, 114, or 116 the user simultaneously selects between the various functions and the various settings for the selected function. Each selection alone might have required numerous choices if the user were forced (as with conventional input/output devices) to navigate through a multitude of binary choices to reach their ultimate selection.

With continue reference to FIG. 4, the mobile device 106 of embodiments also includes other components. For instance, the mobile device 106 includes input/output circuits 426, which interface with its display 120 to present graphic, textual, etc. information there on. Moreover, these input/output circuits 426, in some cases, also interface with appropriately sized keyboards, pointing devices, and other types of hardware input/output devices. Often, these input/output devices are ergonomically difficult to operate for many users.

The communication circuit(s) 428 and antenna 430 of the mobile device 106 allow users to use the mobile device as a telecommunications device. For instance, the mobile device could be a cellular telephone. In which case, the communication circuit 428 and antenna 430 allow the mobile device to operatively connect with a cellular telephony system (not shown). As a result, users often carry mobile devices 106 with them, store personal information on them, and prefer using them for a variety of purposes (including shopping and gathering information).

Exemplary Processes

Figure 5:
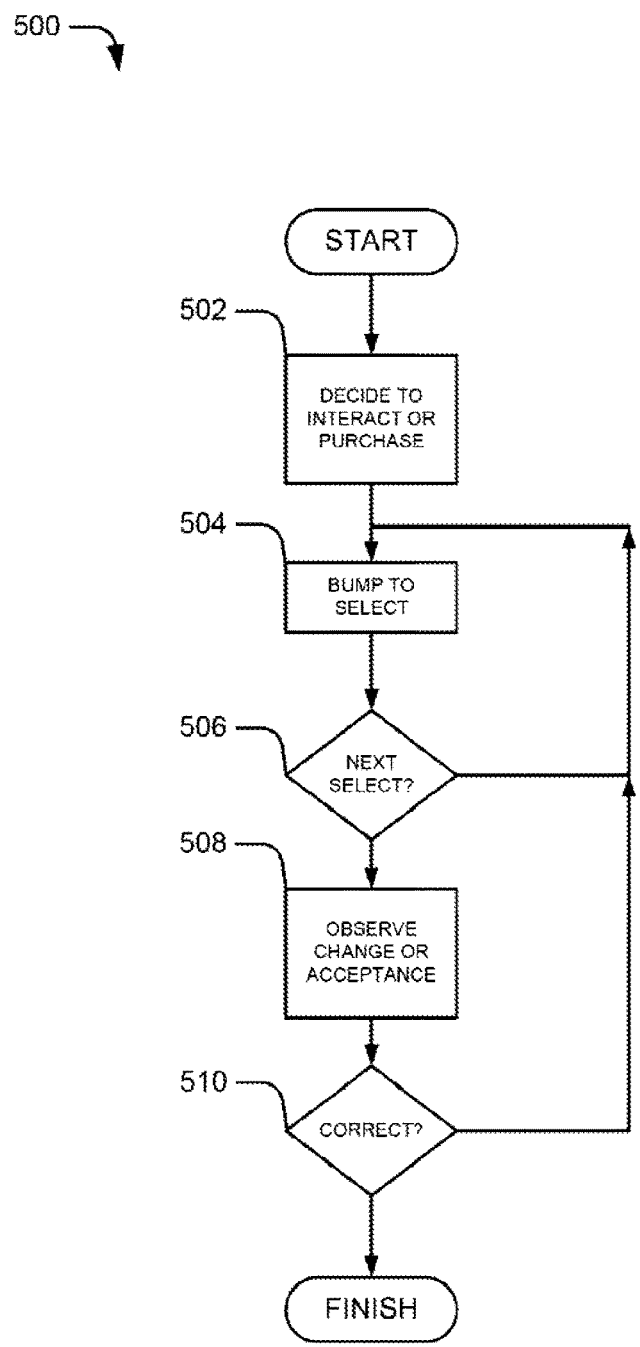
FIG. 5 is a flow chart illustrating a method for making NFC-enabled selections in accordance with embodiments.

FIG. 5 is a flow chart illustrating a method for making NFC-enabled selections in accordance with embodiments. More specifically, method 500 can begin with a user deciding to interact with an input/output device 102. For instance, a user might approach the input/output device 102 seeking information about a product, which they would like, to purchase. In this particular scenario, icon groups 112, 114, and 116 might relate to, respectively clothes, furniture, and electronic consumer goods. See reference 502.

Thus, having decided to interact with the input/output device 102, the user views the plurality of icon groups 112, 114, and 116. The user then selects an icon group 116 (here the one labeled with regard to consumer electronic goods). Furthermore, the user then reads the icons 110 under that group until the user finds one or more icons 110 pertinent to the information, which the user seeks. For instance, one of the plurality of icons 110 in the pertinent icon group 116 might show graphic images of a laptop computer. The user taps or bumps their mobile device 106 in the general vicinity of that particular icon 110 as illustrated by reference 504.

The input/output device 102 could then, if programmed accordingly, display the sought after information. The input/output device 102 might display icon groups 112, 114, and/or 116 related to various types of computers. In addition, or in the alternative, the user might decide to seek information regarding some other subject and could tap another icon 110 labeled to indicate a "new search" or some such similar term. Thus, the user might make another selection by again tapping an icon 110. In which case, method 500 can branch to references 504 as indicated at reference 506.

After some or all of the user selections (i.e., taps) the input/output device 102 could be programmed to respond to the taps by changing the appearance of the GUI 108, one or more icons 110, icon groups 112, 114, and 116, etc. Reference 508 therefore illustrates the user observing the change in the appearance of some portion of the GUI 108. If the change in the appearance of the GUI 108 fails to comport with the selection made by the user, the user can again tap an icon 110 to, for instance, navigate to a previously viewed GUI 108, a home screen, etc. Accordingly, method 500 can branch back to reference 504 as indicated at reference 510. If, however, the change in the appearance of the GUI reflects the selection made by the user, the method 500 could end as illustrated by reference 510.

For instance, one tap by the user might have brought up information regarding a computer (or other product or service) which the user wishes to purchase. If so, another tap could indicate that the user accepts a contract (or the terms thereof) associated with the purchase (and, perhaps, that was even displayed on the GUI 108 at some point).

Figure 6:
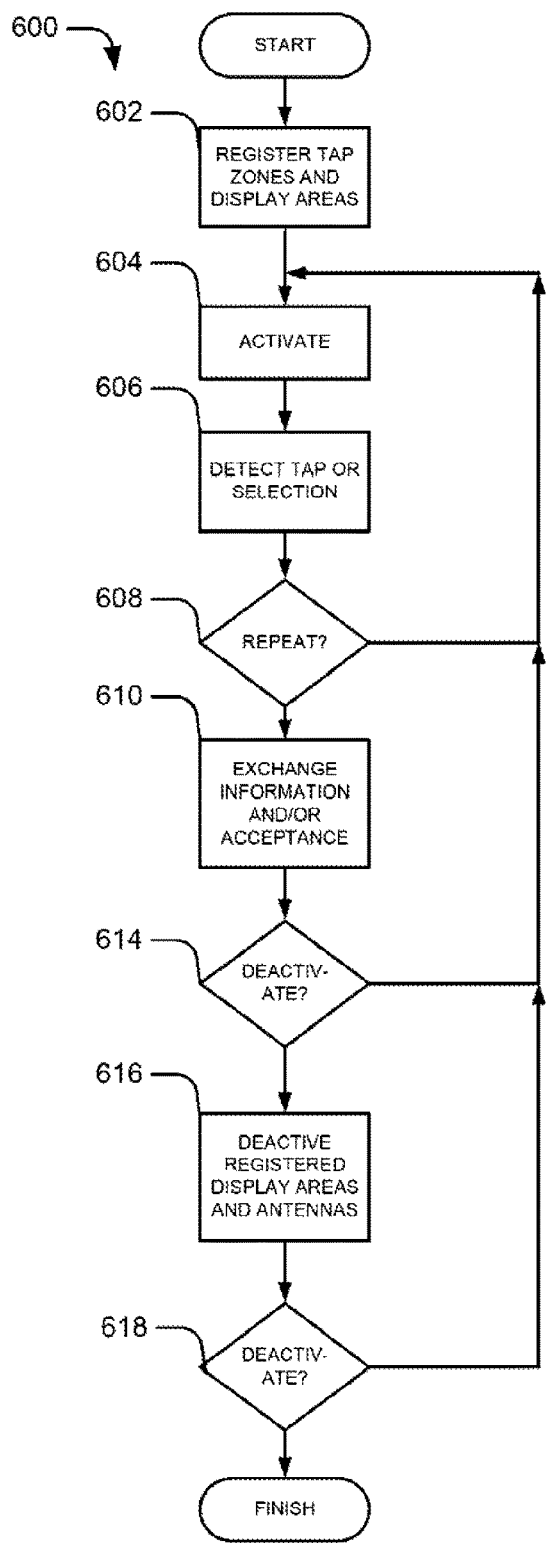
FIG. 6 is a flow chart illustrating another method for making NFC-enabled selections in accordance with embodiments.

FIG. 6 is a flow chart illustrating another method for making NFC-enabled selections in accordance with embodiments. More specifically, method 600 can begin by registering the tap zones 208 and the display areas 414 of the input/output device 102. See reference 602. The registration can begin when the PCB 202, the visual display 308, and other subassemblies are assembled to form the input/output device 102. In some embodiments, the PCB 202 and the visual display 308 can have corresponding registration keys located in various positions so that when these registration keys align, the PCB 202 and the visual display 308 can be assembled and thereafter maintained in a relatively fixed relationship with each other.

Thus, the NFC compatible antennas 206 (as part of the PCB 202) will be registered with the visual display 306 and can be aligned by programming techniques with the display areas 414. Users, therefore, remain free to reprogram the GUI 108 (and the icons 110, icon groups 112, 114, and 116, banners 118, etc. thereof) to re-align the icons 110 and other GUI elements with the NFC compatible antennas 206 and/or tap zones 208. Of course, in some embodiments, the PCB 202 could be replaced to alter the registration between the NFC compatible antennas 206 and the visual display 308. See reference 602.

At some point, it might become desirable to activate the input/output device 102. In such cases, power could be supplied to the input/output device 102 and it could be placed in communication with a network or other source of information via the network interface 412 (see FIG. 4). In accordance with its programming, the processor 404 could cause the GUI 108 to be displayed on the visual display 308. Thus, in many cases, icons 110, icon groups 112, 114, 116, etc. will be included in the GUI 108 at locations corresponding to various tap zones 208. Of course, some display areas 414 (and therefore NFC compatible antennas 206) might have no corresponding icon 110 or might be programmed with passive content.

Moreover, the processor 404 can activate one or more of the NFC compatible antennas via the NFC circuits 402. Indeed, those NFC compatible antennas 206 registered with active icons 110 can be activated by the processor 404 of some embodiments. If desired, the NFC circuits 402 can include sensors to determine when the NFC compatible antennas 206 have become active (whether by command from the processor 404 or otherwise). Thus, the NFC circuits 402 could communicate to the processor 404 which particular NFC compatible antennas 206 are active. Moreover, responsive to such notifications, the processor 404 could change the appearance of the corresponding icons 110 accordingly. For instance, icons 110 corresponding to active NFC compatible antennas 206 could be highlighted while icons 110 corresponding to inactive antennas are either not displayed, are grayed out, or otherwise displayed in such a way to indicate that the corresponding NFC compatible antennas 206 are inactive. See reference 604.

Thus, with the icons 110 and other elements of GUI 108 displayed as programmed and with the NFC compatible antennas (de)activated as programmed, a user might approach the input/output device 102 to make purchases, gather information, etc. When the user taps the visual display 308, some of the NFC compatible antennas 206 in the input/output device will probably magnetically couple with the NFC compatible antennas 420 in the mobile device 106. As a result, the corresponding NFC circuits 402 and 424 of the input/output device 102 and the mobile device 106, respectively, will sense the proximity (and therefore the tap) of the mobile device 106 and the NFC compatible antenna 206 in their corresponding tap zones 208.

Within the input/output device 102, the NFC circuit(s) 402 involved can send an indication of which NFC compatible antennas 206 coupled (however weakly) with the NFC compatible antenna 420 of the mobile device 106. In response, the processor could change the appearance of the corresponding icon(s) 110 or other GUI component(s). In case the NFC compatible antenna 420 of the input/output device coupled with more than one of the NFC compatible antennas 206 of the input/output device 102, the processor 404 could be programmed to resolve which tap zone 208 the user intended to tap. For instance, the processor 404 (with the aid of the NFC circuits 402) could select the NFC compatible antenna 206 most strongly coupled to the NFC compatible antenna 420 (and its icon 110 displayed therein) as the intended target of the user tap. See reference 606.

A somewhat similar process might occur within the context of the input/output device 102. In other words, the NFC circuit 422 could sense the coupling of the NFC compatible antennas 206 and 420 and communicated the same to the processor 432. In turn, the processor 432 might change the appearance of one or more of the output elements 122 and/or 124 of the mobile device 106. This change could signal to the user that the tap succeeded in establishing communication with the input/output device 102.

In any case, the method 600 could repeat (as reference 608 indicates) until the user has reached the information, which the user sought. For instance, the user could have been seeking the terms and conditions associated with a contract for the purchase of a good or service offered through the input/output device 102. In which case, the processor will have output that information or perhaps output an icon 110 (which if tapped) would indicate acceptance of the contractual terms and conditions. The user could tap the icon 110 to accept the contract in such scenarios.

As a result, and if the input/output device and mobile device are programmed in a corresponding fashion (via for instance a cellular telephone application), the two devices 102 and 106 could exchange information. For instance, the mobile device 106 could send to the input/output device 102 information concerning the user and/or purchasing information preferred for use by the user. Of course, the user could be presented with an option to not transfer some or all of that information. In addition, or in the alternative, the input/output device 102 could send sought after information to the mobile device 106 and/or could identify itself (and any company, organization, etc. with which it is associated) to the input/output device 106. Therefore, information could be exchanged as reference 610 illustrates.

At some point, the processor 404 might de-activate one or more of the NFC compatible antennas 206. For instance, power consumption considerations could suggest deactivating some or all of the input/output device 102 or a user might have programmed a particular NFC compatible antenna 206 and its registered display areas 414 (and/or icons 110) to become inactive. In such cases, the processor could send an indication to the NFC circuits 402 to de-activate the appropriate NFC compatible antennas 206. When the processor 404 receives confirmation from the NFC circuits 402 that the corresponding NFC compatible antennas 206 are no longer active, the processor 404 could change the appearance of the corresponding icons 110. See reference 614 and 616. Moreover, as reference 618 indicates, method 600 can repeat in whole or in part as might be desired.

Thus, embodiments provide, inter alia, one-tap input/output devices, point of sale devices, methods, and computer readable media storing related instructions. More specifically, some embodiments provide input/output devices, which include a programmable visual display, an array of near field coupling compatible antennas, a processor, and a memory in communication with the processor. The array of antennas is positioned at least a first distance from the first surface but within a second distance from the second surface. Moreover, the antennas are at least a third distance apart from one another to create tap zones (which can be non-overlapping) associated with the antennas on a surface of the display.

In the current embodiment, the processor communicates with the memory to execute instructions stored there in which cause the processor to control the activation of each of the antennas. The instructions also cause the processor to display an icon in each tap zone when the associated antenna is active and to accept from one of the antennas a signal indicating that an external device tapped on the tap zone corresponding to that antenna. The instructions also cause the processor to respond to that tap by changing the icon associated with that tap zone and to output an indication of the tapped tap zone. Some embodiments further provide input/output devices in which the display is a touch screen or a liquid crystal diode display.

Implementation Notes

In the above description of exemplary implementations, for purposes of explanation, specific numbers, materials configurations, and other details are set forth in order to better explain the present invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

What is claimed is:

1. A near field coupling tap (NFC-tap) kiosk comprising:
a visual display;
a first near field coupling (NFC) compatible antenna positioned relative to the visual display to create a first NFC tap zone associated with the visual display;
a second NFC compatible antenna positioned relative to the visual display to create a second NFC tap zone associated with the visual display; and
a processor in communication with the visual display and the first and the second NFC compatible antennas, the processor being configured to determine whether an external NFC compatible device is proximate to the first NFC tap zone or the second NFC tap zone via NFC tapping by detecting coupling between the external NFC compatible device and one of the first NFC compatible antenna or the second NFC compatible antenna in accordance with a near field communication protocol.

2. The kiosk as recited in claim 1, wherein the first and second NFC compatible antennas are from among an array of NFC compatible antennas associated with the visual display.

3. The kiosk as recited in claim 1, wherein the processor is further configured to cause the visual display to present a first icon in the first NFC tap zone and to present a second icon in the second NFC tap zone.

4. The kiosk as recited in claim 3, wherein the processor is further configured to execute a function associated with one of the first or the second icon upon detecting a proximity of the external device to one of the first NFC tap zone or the second NFC tap zone, respectively.

5. The kiosk of claim 3, wherein the first and the second icon are aligned with the first NFC tap zone and the second NFC tap zone, respectively.

6. The kiosk of claim 3, wherein the processor is further configured to alter at least one of the first icon or the second icon based upon which of the first NFC tap zone or the second NFC tap zone the external NFC compatible device is tapped.

7. The kiosk as recited in claim 1, wherein the processor is further configured to control which of the first NFC compatible antenna or the second NFC compatible antenna is active.

8. The kiosk as recited in claim 7, wherein the processor is further configured to cause the visual display to present an icon in one of the first NFC tap zone or the second NFC tap zone associated with one of the first NFC compatible antenna or the second NFC compatible antenna, respectively, that is active.

9. The kiosk as recited in claim 1, wherein the processor is further configured to detect a signal from one of the first NFC compatible antenna or the second NFC compatible antenna, the signal being indicative of NFC tapping, and to display an icon in a respective NFC tap zone of the visual display that corresponds to the first NFC compatible antenna or the second NFC compatible antenna in response to the detected signal.

10. The kiosk as recited in claim 1, wherein the external NFC compatible device concurrently couples to the first and the second NFC tap zone, and
wherein the processor is further configured to determine whether the external NFC compatible device is tapped to the first NFC tap zone or to the second NFC tap zone by detecting which of the first or the second NFC compatible antennas the external NFC device is more strongly coupled.

11. The kiosk as recited in claim 1, further comprising:
a third NFC compatible antenna positioned relative to the visual display to create a third NFC tap zone associated with the visual display; and
a fourth NFC compatible antenna positioned relative to the visual display to create a fourth NFC tap zone associated with the visual display,
wherein the first NFC compatible antenna and the second NFC compatible antenna are configured such that the first NFC tap zone and the second NFC tap zone form non-overlapping NFC tap zones, and
wherein the third NFC compatible antenna and the fourth NFC compatible antenna are configured such that the third NFC tap zone and the fourth NFC tap zone form a contiguous NFC tap zone.

12. The kiosk as recited in claim 11, wherein the processor is further configured to cause the visual display to present a first icon aligned with the first NFC tap zone, a second icon aligned with the second NFC tap zone, and a third icon aligned with the third NFC tap zone, and to determine whether the external NFC compatible device is tapped to the first NFC tap zone, the second NFC tap zone, or the third NFC tap zone by detecting NFC coupling between the external NFC compatible device at one of the first NFC tap zone, the second NFC tap zone, or the contiguous NFC tap zone, respectively.

13. A non-transitory, tangible computer-readable medium storing machine readable instructions in a device including a visual display that, when executed by a processor, cause the processor to:
cause the visual display to present a first and a second icon, the first icon being located within the visual display registered with a first near field coupling (NFC) compatible antenna that is associated with a first NFC tap zone, and the second icon being located within the visual display registered with a second NFC compatible antenna that is associated with a second NFC tap zone;
determine whether an external NFC compatible device is proximate to the first NFC tap zone or the second NFC tap zone via NFC tapping by detecting coupling between the external NFC compatible device and one of the first NFC compatible antenna or the second NFC compatible antenna in accordance with a near field communication protocol; and
execute a function associated with one of the first or the second icon upon detecting the proximity of the external device to one of the first NFC tap zone or the second NFC tap zone, respectively.

14. The non-transitory, tangible computer-readable medium as recited in claim 13, further storing instructions that, when executed by the processor, cause the processor to control which of the first NFC compatible antenna or the second NFC compatible antenna is active.

15. The non-transitory, tangible computer-readable medium as recited in claim 14, further storing instructions that, when executed by the processor, cause the processor to cause the visual display to adjust one of the first or the second icon to indicate which of the first NFC compatible antenna or the second NFC compatible antenna, respectively, that is active.

16. The non-transitory, tangible computer-readable medium as recited in claim 14, further storing instructions that, when executed by the processor, cause the processor to cause the visual display to adjust one of the first or the second icon based upon which of the first NFC tap zone or the second NFC tap zone the external NFC compatible device is tapped.

17. The non-transitory, tangible computer-readable medium as recited in claim 13, wherein the instructions, when executed by the processor, cause the display to present the first and the second icon aligned with the first NFC tap zone and the second NFC tap zone, respectively.

18. The non-transitory, tangible computer-readable medium as recited in claim 13, wherein the external NFC compatible device concurrently couples to the first and the second NFC tap zone, and further storing instructions that, when executed by the processor, cause the processor to determine whether the external NFC compatible device is tapped to the first NFC tap zone or to the second NFC tap zone by detecting which of the first or the second NFC compatible antennas the external NFC device is more strongly coupled.

* * * * *